United States Patent [19]

Garry

[11] 4,027,737
[45] June 7, 1977

[54] JACKING MEANS FOR PROVIDING ADDITIONAL CLEARANCE BETWEEN THE ENGINE AND BODY OF A REAR ENGINE DRIVEN VEHICLE

[75] Inventor: Frederick W. Garry, El Cajon, Calif.

[73] Assignee: Rohr Industries, Inc., Chula Vista, Calif.

[22] Filed: May 9, 1975

[21] Appl. No.: 576,010

[52] U.S. Cl. .............................. 180/11; 180/64 M; 254/86 H

[51] Int. Cl.² .......................................... B60K 5/10

[58] Field of Search ............ 180/1 R, 64 L, 64 M, 180/89 A, 11, 12; 254/86 R, 93 VA, 45, 86 H, 93 R, 8 R, 93 L; 296/35, 35 A

[56] References Cited

UNITED STATES PATENTS

| | | | |
|---|---|---|---|
| 1,691,807 | 11/1928 | Hollister | 254/93 L |
| 1,770,279 | 7/1930 | Morrison | 180/64 M |
| 2,425,948 | 8/1947 | Lucien | 180/11 |
| 3,759,488 | 9/1973 | Lukas | 254/8 R |
| 3,765,500 | 10/1973 | Reeves | 180/89 A |
| 3,842,927 | 10/1974 | Tantlinger | 180/64 L |

*Primary Examiner*—Kenneth H. Betts
*Attorney, Agent, or Firm*—Patrick J. Schlesinger; Frank D. Gilliam

[57] ABSTRACT

In a bus having a replaceable power drive unit docked in a compartment provided in the rear end of the bus body, jacking devices are provided between the power drive unit and the body for raising the rear end of the body relative to the power drive unit, thereby tilting the body about the axes of the front wheels of the bus as a fulcrum to provide increased working clearance between the body and the bus propulsion engine, which is mounted on the power drive unit. Safety support devices are provided to retain the body in elevated position, and latch devices to retain it in lowered, operative position.

3 Claims, 8 Drawing Figures

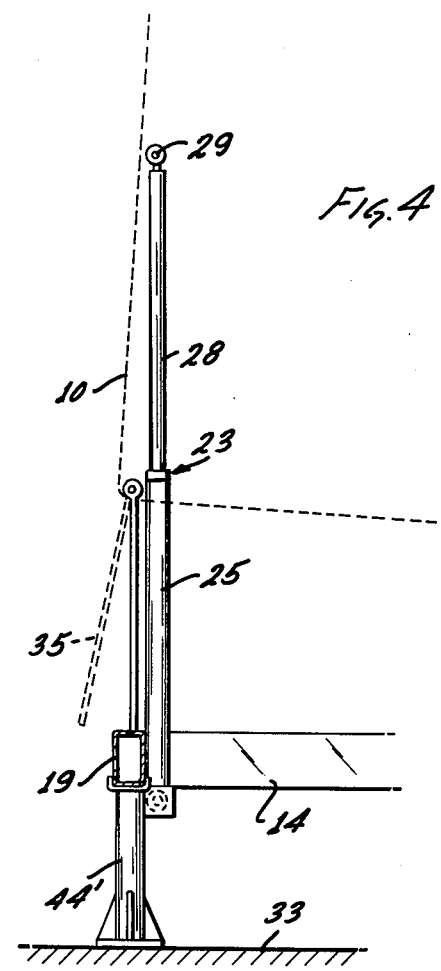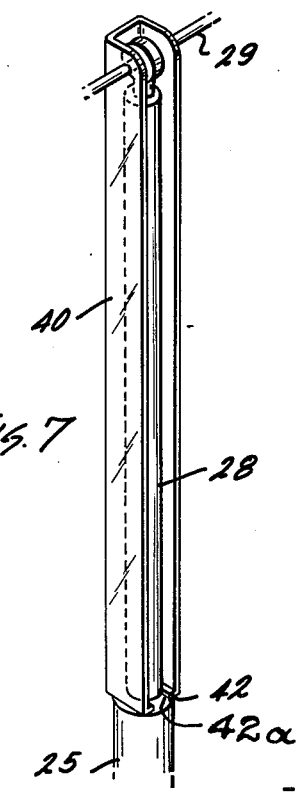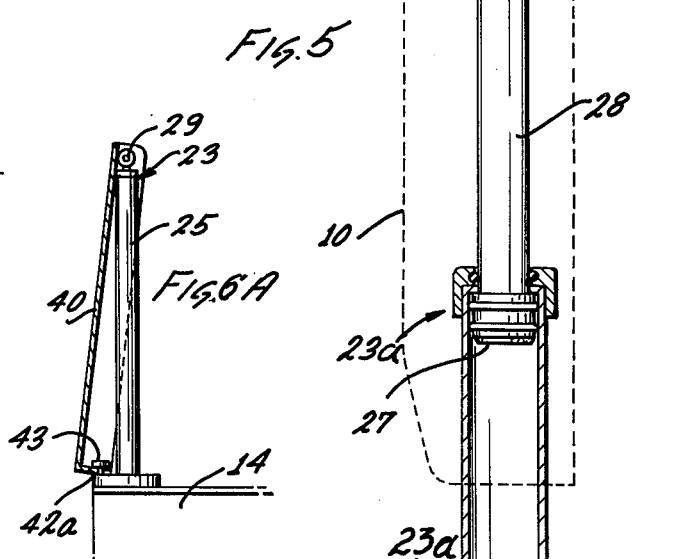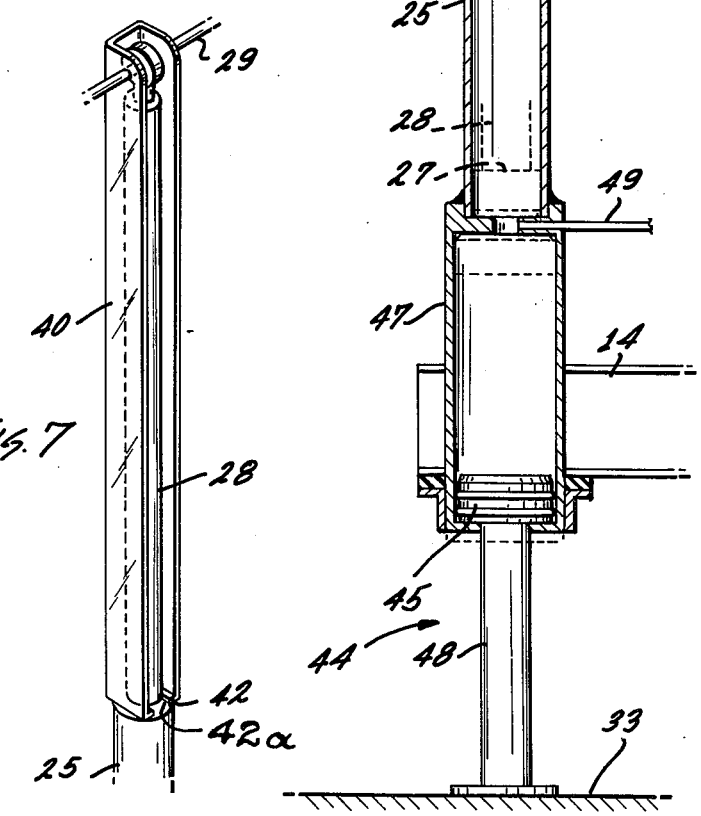

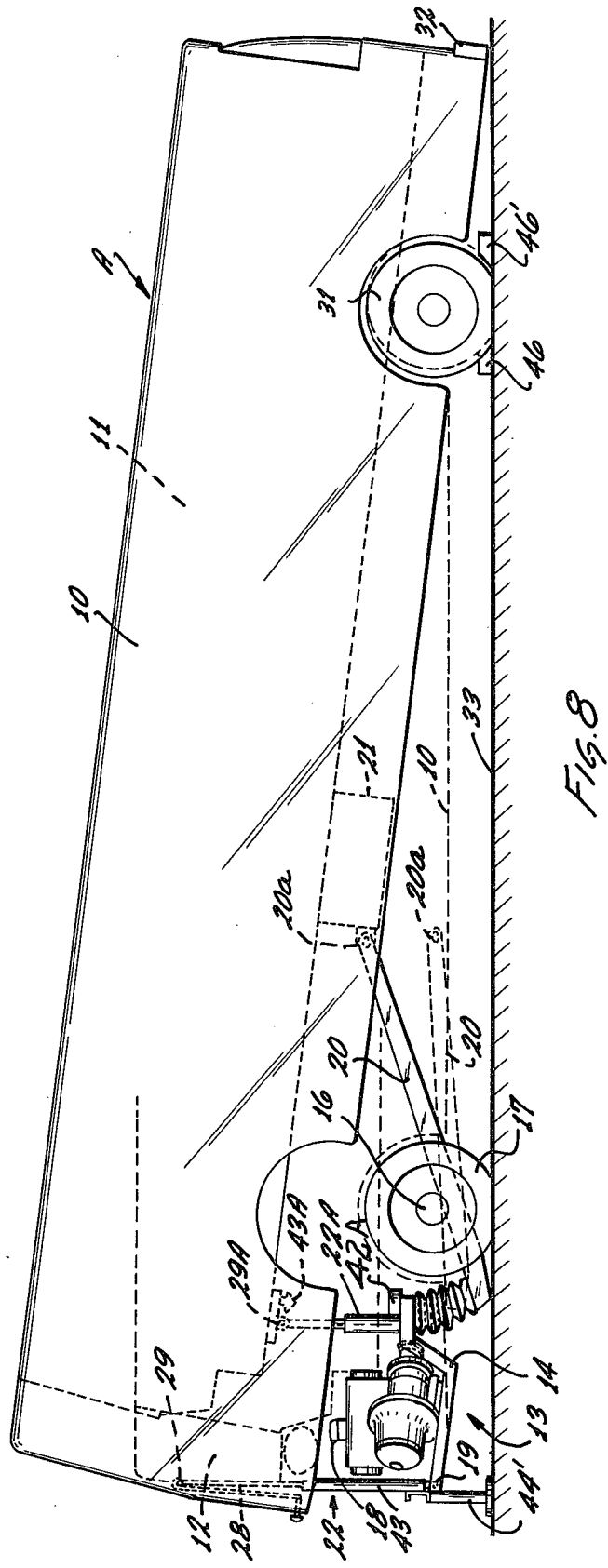

JACKING MEANS FOR PROVIDING ADDITIONAL CLEARANCE BETWEEN THE ENGINE AND BODY OF A REAR ENGINE DRIVEN VEHICLE

BACKGROUND OF THE INVENTION

In many modern buses having their propulsion engines mounted in an engine compartment provided in the rear end of the vehicle body, working space around such engines is extremely limited, since it is desirable to employ the maximum amount of available space within the body for the accommodation of passengers. This restriction of working space around the engine is worsened by the current tendency in bus design toward bigger engines and the proliferation of electrical, air and hydraulic accessory equipment, including air-conditioning, emission control, lighting, and actuators of various types such as those for the bus doors, etc.

In U.S. Pat. No. 3,842,927, Inventor Keith W. Tantlinger, assigned to the assignee of the present invention, there is disclosed a bus having a power drive unit removably docked in a compartment provided in the rear portion of the bus body, said power drive unit comprising a frame releasably connected to the bus body, the frame being mounted for resilient support on, and in driving relation with, the rear wheels of the bus. The propulsion engine and various accessory mechanisms are mounted on this frame, and a tongue extending forwardly from the rear axle is hitched at its forward end to a strong, thrust resistant element of the bus body. The present invention is disclosed as being incorporated in a bus having a power drive unit of the type referred to, but can be employed with other rear engine vehicles wherein the engine and engine driven rear wheel assembly is readily releasable from the rear end of the vehicle body.

It is, of course, common practice to tilt the cab of a truck or tractor as shown, for example, in U.S. Pat. Nos. 3,857,602 and 3,851,913, but such arrangement is in no way suggestive of the present invention wherein the entire vehicle body is jacked up at its rear end relative to the propulsion engine embodied in a power drive unit.

SUMMARY OF THE INVENTION

In a rear engine driven automotive vehicle wherein the rear end of the vehicle body is releasably connected to a power drive unit which includes the vehicle propulsion engine and the rear drive wheels of such vehicle, jacking means is operatively interposed between a rearward element of the body and an element of the power drive unit. Releasable support means also preferably is provided to support the body in elevated position in the event of failure or accidental release of the jacking means. Upon release of the rear end of the body from the power drive unit, and actuation of the jacking means, the rear end of the body is elevated relative to the power drive unit, thereby tilting the body about the axes of the front support wheels of the vehicle as a fulcrum to thereby provide increased working space between the engine and adjacent elements of the vehicle body.

BRIEF DESCRIPTION OF THE DRAWINGS

The objectives and advantages of the present invention will be apparent from the following description and the accompanying drawings, wherein:

FIG. 4 is a fragmentary, sectional view taken along line 4—4 of FIG. 2, the safety support rod being shown in solid lines in body supporting position, and in broken lines in body releasing position.

FIG. 5 is an enlarged, fragmentary, sectional view of a modified form of jacking cylinder in extended position the bus body being shown in broken lines.

FIG. 6 is a detail sectional view showing a combined safety support and latch member with the hydraulic cylinder extended and the safety support and latch member swung out to body releasing position.

FIG. 6a is a view generally similar to FIG. 6, but with the cylinder in retracted and latched condition.

FIG. 7 is an enlarged, detail perspective view showing the upper portion of the mechanism of FIG. 6 with the safety support and latch member in body supporting position.

FIG. 8 is a somewhat diagrammatic, side, elevational view showing, in solid lines, the rear end of the vehicle body elevated relative to the power drive unit, and in broken lines, in lowered, operative condition.

DETAILED DESCRIPTION OF THE DRAWINGS

Figure 1:
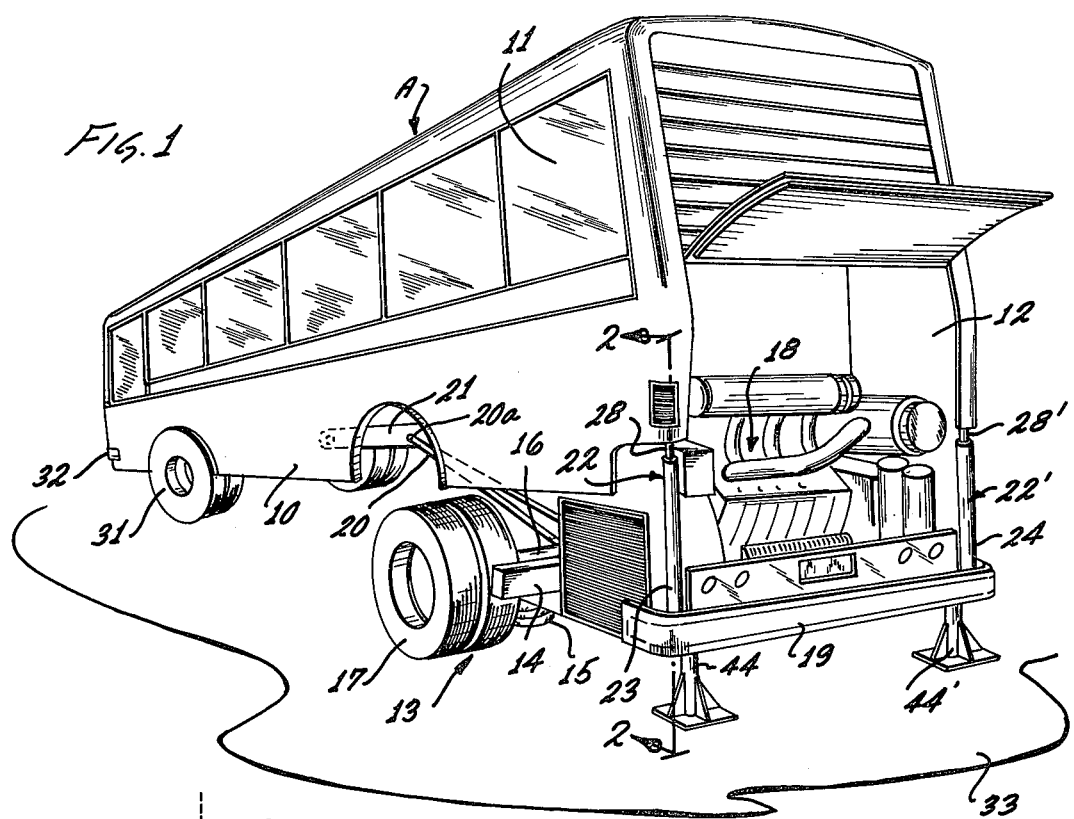
FIG. 1 is a fragmentary, perspective view showing a bus embodying the present invention with the rear end of the body jacked up for inspection and servicing of the engine and associated mechanism.

Referring to the drawings in detail, FIGS. 1, 2, 4 and 8 show a bus A with the rear end of its body 10 elevated. An engine compartment 12, usually of minimum practical size, is provided at the rear end of the bus body 10, and in this compartment is docked a removable power drive unit 13, of the general type disclosed in U.S. Pat. No. 3,842,927 mentioned previously herein.

The illustrative power drive unit 13 comprises a frame 14 resiliently supported as by air or other spring means 15 on a rear wheel and axle assembly comprising axle 16 and rear drive and support wheels 17. A propulsion engine 18, mounted on the power drive unit frame 14, is in power driving relation with the rear wheels 17.

Figure 3:
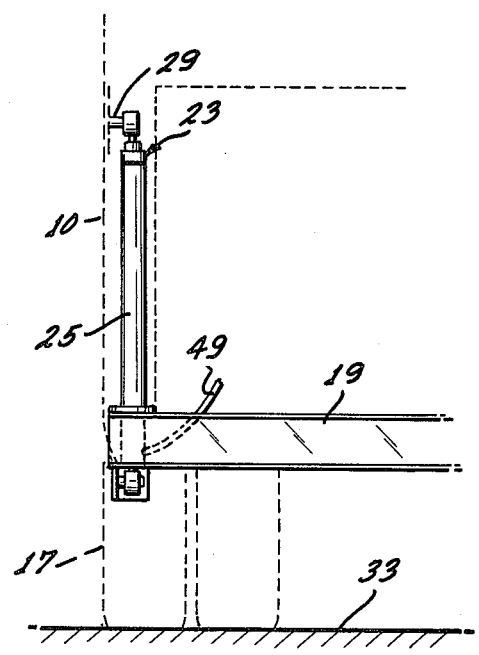
FIG. 3 is a view generally similar to FIG. 2, but with the jacking means retracted to lower the bus body.

The power drive unit frame 14 is releasably secured to the body 10 when the latter is in lowered or driving condition, as shown in FIG. 3, and has a usual rear bumper 19 mounted across the rear end thereof.

A V-shaped tongue 20, with its apex forward, is mounted to the rear axle 16 and has releasable, pivotal connection at its forward end, by hitch means 20a, to a bus body element, such as a bolster 21, which is of sufficient strength to withstand the usual stresses to which it may be subjected in use.

Jacking means 22, operatively interposed between an element of the power drive unit 13 and a rear portion of the bus body 10, comprises a pair of hydraulic cylinders 23 and 24, one on each side of the vehicle. Since the illustrated hydraulic cylinders 23 and 24 are identical, only the cylinder 23 is described in detail herein, the same reference numerals being used to designate corresponding parts of both cylinders with the prime (') added to those for the right hand cylinder 24.

The hydraulic cylinder 23 comprises an upright cylinder portion 25, with its base supported for limited tilting movement on the power drive unit frame 14. A piston such as that 27 shown in FIG. 5 is sealed for axial movement in the cylinder portion 25, and is connected to a usual piston rod 28 which extends from the upper end of the cylinder 23. The upper end of the piston rod 28 is connected to a suitably strong rear element of the bus body 10 by means of a pivot fitting 29, see FIGS. 2 and 3, secured to the bus body. Pressurized hydraulic fluid for actuating the hydraulic cylinders 23 and 24 may be provided by the vehicle's own hydraulic system, with which most buses are at present provided. However, if necessary or desirable, such pressurized hydraulic fluid may be supplied by other well known generating means.

The hydraulic cylinders 23 and 24 are of sufficient effective length, and combined strength, to raise the rear end of the bus body 10 to a selected height, thereby pivoting the body 10 about the axes of the vehicle front wheels 31 as a fulcrum and raising the rear end of the body to a height sufficient to provide selected additional working clearance between the body 10 and the propulsion engine 18 and its associated mechanisms and accessories, but not sufficient to cause the front end of the bus body 10 or the front bumper 32, see FIGS. 1 and 8, to touch a fairly level surface 33 upon which the bus is parked for servicing. As illustrated in FIGS. 1 and 8, the power drive unit frame 14 is free for sufficient pivotal movement relative to the rear wheel and axle assembly to permit required elevation of the forward end of the tongue 20.

Figure 2:
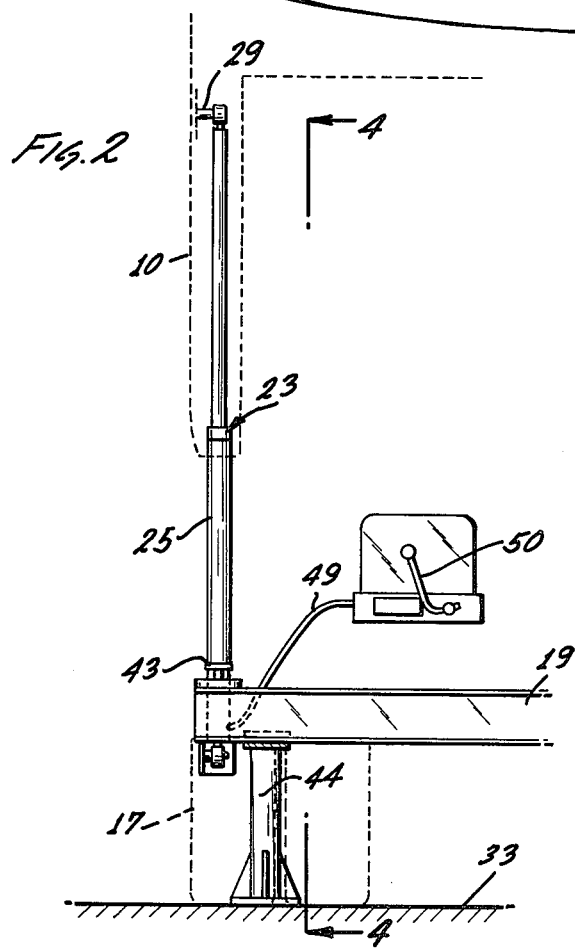
FIG. 2 is an enlarged, somewhat diagrammatic, fragmentary, rear, elevational view of the left rear portion of the bus as shown in FIG. 1, the bus body being shown in broken lines.

Releasable means preferably is provided to secure the body 10 in its fully lowered position for normal operation of the bus, and safety support means also is provided to insure that the body will not lower from its elevated position of FIGS. 1, 2 and 8 in the event of accident or failure of the jacking means.

A simple form of safety support means is shown in FIGS. 2–4 and comprises a support rod 35 of sufficient length and strength for the purpose, one of which rods is pivotally connected at its upper end to each side of the bus body 10, and is located to rest with its lower end supported on an element of the power drive unit 13 as shown in solid lines in FIGS. 2–4. This concept is frequently used to support the hingedly mounted hood of a passenger automobile in raised position.

A modified, and presently preferred, form of combined safety support and latch means is shown in FIGS. 6, 6-A and 7, and comprises a trough shape support and latch member 40 mounted, one on each of the hydraulic cylinders 23 and 24.

The member 40 is pivotally mounted at its upper end on the pivot fitting 29 upon which the piston rod 28 is mounted, and is of a size to receive the cylinder 25 therein. A plate 42 is welded transversely across the lower end of each member 40, and has a notch 42a therein to receive the piston rod 28 as shown in FIG. 7. When the bus body 10 is elevated by the jacking means 22 sufficiently, the safety support member 40 swings inwardly by gravity to cause the piston rod 28 to enter the notch in the plate 42 as shown in FIG. 7. Then, in the event that the hydraulic pressure in the cylinder is relieved, whether accidentally or on purpose, the notched plate 42 bears on the upper end of the cylinder 23 to support the body 10 in its elevated position.

To lower the body 10 from its elevated, supported position, the cylinders 23 and 24 are initially pressurized, if necessary, to relieve the load from their support members 40, and the latter are swung clear of the cylinders 23 and 24 as shown in FIG. 6. The body 10 is then lowered by reducing the hydraulic pressure in the cylinders.

For anchoring the body 10 in its fully lowered, operative position, the lower end of each cylinder 23 and 24 is provided with a latch pin 43, see FIGS. 6 and 6A, comprising a shank portion 43a of a size to enter the notch 42a in its respective end plate, and a head portion 43 wider than the notch 42a to prevent extension of the jacking means when the notched end plate 42 is fitted beneath the head portion of the latch pin as shown in FIG. 6A.

In order to support the rear end of the power drive unit frame 14 against undue downward displacement when the jacking means 22 is actuated to elevate the rear end of the body 10, support means may be provided for the frame 14 by conventional standards 44 and 44' as shown in FIGS. 1, 2 and 4. However, to insure that such support is not inadvertently omitted, and also to avoid the necessity for providing and inserting support means each time the jacking means 22 is actuated, it is preferred that automatically deployed support means be provided, for example, a downwardly directed secondary piston 45, see FIG. 5, which is mounted for axial, sealed movement in the lower end of each of the hydraulic cylinders, such as cylinder 23a. These secondary pistons 45 and the lower bore portions of the cylinders in which they operate preferably are of larger diameter than corresponding parts of the upper cylinders and body elevating pistons 27. A downwardly extending piston rod 48 is provided on each of the lower pistons 45 and when deployed extends downwardly to provide bearing support on a bus supporting surface 33 when the hydraulic cylinders are actuated to raise the rear end of the body 10.

OPERATION OF THE ILLUSTRATED FORM OF THE INVENTION

Operation of the illustrative form of the invention comprises driving a vehicle A embodying the invention onto a substantially level surface 33 where it is to be serviced, and preferably securing the vehicle against rolling movement in a usual manner as by chocks 46 and 46', see FIG. 8. With the latch means, such as the member 40 released, pressurized fluid is then introduced into the hydraulic cylinders via a suitable high pressure hose 49 and hydraulic control valve 50, see FIG. 2, to extend the lower piston rods 48 into desired supporting relation with the surface 33 and to extend the piston rods 28 and 28' to elevate the rear end of the body 10, tilting the body about the axes of the front support wheels 31 as a fulcrum, to the position illustrated in solid lines in FIGS. 1 and 8.

As the piston rods 28 and 28' approach their fully extended position, the notched plate 42 on the lower ends of the safety support members 40 clear their respective cylinders, and swing by gravity into body supporting position over their respective cylinders 23 and 24 as shown in FIG. 7, thereby insuring support of the body 10 in its elevated position in the event of a drop in pressure in the hydraulic cylinders 23 and 24. The body 10 is lowered by swinging the support members 40 and 41 clear of their cylinders and reducing the pressure in the cylinders as by means of the valve 50.

While the illustrative jacking means comprises hydraulic cylinders located in the rear corners of the bus body, it is obvious that other jacking means at other locations, such as at 22A, see FIG. 8, may be employed, and that other types of jacking means may be used, such as a screw and nut type or suitable force-multiplying means. Also, numerous other types of latches of types known or obvious to one familiar with the art, may be employed, such as a hydraulically releasable latch 43A and socket 42A, see FIG. 8. It is expected that a specific design will be provided for each model or line of buses embodying the invention, and that suitable jacking means, safety support means, and latch means will be selected or designed for each thereof.

The invention provides simple, safe, economical, instantly operable mechanism for elevating the rear end of the body of a vehicle of the type set forth herein, thereby providing valuable increased working clearance between the vehicles body and the vehicle propulsion engine and its associated mechanisms, thereby simplifying and facilitating inspection of, and work upon, such mechanisms.

Having thus described the invention, what is claimed as new and useful and desired to be secured by U.S. Letters Patent is:

1. In combination with an automotive vehicle comprising a body with a forward passenger compartment and a rear engine compartment therein with dirigible front support wheels journaled beneath a forward portion of the body, and a power drive unit releasably connected to the body and comprising rear support and drive wheels and a vehicle propulsion engine in driving relation with the rear support and drive wheels, said power drive unit being removably docked in a rear portion of the body with the engine in the engine compartment, the improvement which comprises:

jacking means interposed between an element of the power drive unit and a rear element of the bus body, said jacking means being operable, upon release of the power drive unit from the body, to elevate the rear end of the body relative to the power drive unit, thereby tilting the body about the axes of the front wheels as a fulcrum to provide additional working clearance between the propulsion engine and elements of the body adjacent thereto, said jacking means comprising a pair of jacks, one of which is mounted in upright position on each side of the bus, the lower end of each jack being mounted in supported relation on an element of the power drive unit, and the upper end of each jack being in thrust relation with an element of the bus body;

wherein a safety support member is provided for each jack, each safety support member being of trough shape and of internal width sufficient to receive its respective hydraulic cylinder therein, each hydraulic jack comprises an upright cylinder, a piston sealed for axial movement in each cylinder, and a piston rod attached to each piston and extending upwardly from each cylinder, the upper end of each safety support member being pivotally mounted adjacent the attachment of the upper end of its respective hydraulic cylinder to the body with the open side of its trough shape facing its respective cylinder, and a support plate is secured transversely across the lower end of each trough shape support member with a notch therein of a size, and so located, as to receive the piston rod of its respective hydraulic jack therein, each safety support member being of a length and so located to swing by gravity to receive its respective piston rod in the notch in its support plate as the jacking means reaches fully extended condition.

2. The improvement defined in claim 1 wherein a latch pin is mounted adjacent the lower end of each hydraulic jack cylinder, each latch pin having a shank portion of a size to fit into the notch in the support plate of its respective safety support member, and having a head portion of a size to fit within the trough shape of its respective support member, but of larger diameter than the width of the notch in its respective support plate, each latch pin being so located that when both hydraulic jacks are in retracted condition to fully lower the bus body to operating position, and each safety support member is swung inwardly toward its respective hydraulic jack, the shank of each of said latch pins enters the notch in the support plate of its respective safety support member, and each support plate fits snugly beneath the head of its respective latch pin, thereby latching the jacks against accidental extension.

3. In a bus comprising a body with a forward passenger compartment and a rear engine compartment therein, with dirigible front support wheels journaled beneath a forward portion of the body, and a power drive unit removably docked in the rear end of the bus, said power drive unit comprising a frame releasably secured to a rear portion of the body, said frame having an extension extending a substantial distance forward from said engine and means pivotally connecting its forward end to the vehicle body and having the bus propulsion engine mounted on said frame for location within the engine compartment, said engine being in operative, driving connection with a pair of rear support wheels journaled on an axle which is in resilient supporting relation with said frame, the improvement which comprises:

hydraulic jacking means interposed between an element of the power drive unit and a rear element of the bus body, and operable, upon release of the power drive unit frame from the body, to elevate the rear end of the body relative to the power drive unit frame, thereby tilting the body about the axes of the front wheels as a fulcrum to provide additional working clearance between the propulsion engine and elements of the body adjacent thereto; and means interposed between an element of the power drive unit and the ground to preclude movement of the power drive unit when the body is tilted.

* * * * *